(12) United States Patent
Kim et al.

(10) Patent No.: US 10,340,988 B2
(45) Date of Patent: Jul. 2, 2019

(54) METHOD FOR TRANSMITTING/RECEIVING CHANNEL INFORMATION, AND DEVICE THEREFOR

(71) Applicant: LG ELECTRONICS INC., Seoul (KR)

(72) Inventors: Heejin Kim, Seoul (KR); Jiwon Kang, Seoul (KR); Kitae Kim, Seoul (KR); Kilbom Lee, Seoul (KR); Kungmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/750,375

(22) PCT Filed: Jun. 29, 2016

(86) PCT No.: PCT/KR2016/006964
§ 371 (c)(1),
(2) Date: Feb. 5, 2018

(87) PCT Pub. No.: WO2017/022952
PCT Pub. Date: Feb. 9, 2017

(65) Prior Publication Data
US 2018/0227023 A1 Aug. 9, 2018

Related U.S. Application Data

(60) Provisional application No. 62/202,136, filed on Aug. 6, 2015.

(51) Int. Cl.
| | |
|---|---|
| *H04B 7/0456* | (2017.01) |
| *H04B 7/06* | (2006.01) |
| *H04W 16/28* | (2009.01) |

(52) U.S. Cl.
CPC ......... *H04B 7/0456* (2013.01); *H04B 7/0478* (2013.01); *H04B 7/0617* (2013.01); *H04B 7/0641* (2013.01); *H04W 16/28* (2013.01)

(58) Field of Classification Search
CPC .................................................. H04B 7/0456
(Continued)

(56) References Cited

U.S. PATENT DOCUMENTS

| | | | |
|---|---|---|---|
| 6,785,513 B1 | 8/2004 | Sivaprakasam | |
| 8,179,775 B2 * | 5/2012 | Chen | ..................... H04L 1/0029 370/203 |

(Continued)

FOREIGN PATENT DOCUMENTS

| | | |
|---|---|---|
| KR | 10-2010-0099453 A | 9/2010 |
| KR | 10-2011-0033079 A | 3/2011 |

*Primary Examiner* — Lihong Yu
(74) *Attorney, Agent, or Firm* — Dentons US LLP (57) ABSTRACT

The present invention relates to a method for transmitting channel information to a base station in a wireless communication system, and a device therefor, the method comprising the steps of: receiving information on a user equipment (UE) group in which a specific UE is included; receiving, from a representative UE of the UE group, first control information comprising first beam information; determining second beam information on the basis of the first beam information; and transmitting, to a base station, second control information comprising differential information between the determined second beam information and the first beam information.

10 Claims, 7 Drawing Sheets

(58) Field of Classification Search
USPC .......................................................... 375/267
See application file for complete search history.

(56) References Cited

U.S. PATENT DOCUMENTS

| | | |
|---|---|---|
| 2003/0130003 A1* | 7/2003 | Won ...................... H04W 52/42 |
| | | 455/522 |
| 2012/0027111 A1 | 2/2012 | Vook et al. |
| 2013/0084908 A1 | 4/2013 | Joo |
| 2015/0080004 A1* | 3/2015 | Shin ...................... H04W 16/28 |
| | | 455/452.1 |
| 2016/0044584 A1* | 2/2016 | Jung .................... H04B 7/0617 |
| | | 370/330 |

* cited by examiner

METHOD FOR TRANSMITTING/RECEIVING CHANNEL INFORMATION, AND DEVICE THEREFOR

This application is a 35 U.S.C. § 371 National Stage entry of International Application No. PCT/KR2016/006964 filed on Jun. 29, 2016, and claims priority to U.S. Provisional Application No. 62/202,136 filed on Aug. 6, 2015, all of which are hereby incorporated by reference in their entireties as if fully set forth herein.

TECHNICAL FIELD

The present invention relates to a wireless communication, and more specifically, relates to a method and apparatus for transmitting and receiving channel information.

BACKGROUND ART

As a frequency of use of wireless communications of a user increases and the number of categories of services using wireless communications increases, the need for support of a high data rate and high quality of service (QoS) to a user who moves at high speed unlike in a conventional situation has been on the rise. For example, when a plurality of users who use public transportation want to watch multimedia during the ride or a plurality of passengers who ride a personal vehicle driving on a highway use different wireless communication services, a mobile communication system needs to support a high-quality wireless service to the above users.

The service is a new model that has not been present in a conventional wireless communication service model, and in order to support the service, there is a need to design a new system for innovatively enhancing a mobile communication network or embodying the mobile communication network rather than affecting a network infrastructure. As one of solutions for this, a vehicular multiple input multiple output (MIMO) system for installing a large size antenna array in a vehicle so as to allow the vehicle to receive a high-quality service also in a high speed movement situation via a large array gain and relaying received data by a central unit of the vehicle to a riding passenger has been considered.

When a large antenna array is installed outside a vehicle and wireless communications between a base station and a passenger in a vehicle is relayed through the large antenna array, degradation in communication performance may be prevented due to penetration loss with an average value of about 20 dB, a large array gain may be ensured due to use of many reception (Rx) antennas compared with a personal portable communication devices, and a distance between the Rx antennas may be easily ensured so as to easily ensure Rx diversity. Accordingly, the vehicular MIMO may provide an excellent communication service compared with a personal portable device without additional investment of infrastructures.

However, despite this advantage, there has been no example of a large antenna array installed in a vehicle. A vehicle is significantly expensive equipment compared with a conventional personal portable communication device and is not easy to improve and upgrade. In addition, the vehicle is equipment that satisfies as many as possible requirements such as design concept and an aeromechanical structure as well as communication performance, and thus it is not easy to install a large antenna array that limits aesthetic/aeromechanic vehicle design. In order to remove visual inconvenience of existing antennas, vehicle manufacturers have used a combination antenna with degraded performance compared with a single antenna.

In order to resolve spatial restriction of a large antenna array, installment of a distributed antenna array system for embodying an arrayed antenna system through a plurality of arrays instead of a single array in a vehicle has been considered.

DISCLOSURE

Technical Problem

An object of the present invention devised to solve the problem lies in a method and device for effectively transmitting and/or receiving channel information in a wireless communication system.

It is to be understood that both the foregoing general description and the following detailed description of the present invention are exemplary and explanatory and are intended to provide further explanation of the invention as claimed.

Technical Solution

In an aspect of the present invention, provided herein is a method of transmitting channel information to a base station (BS) by a specific user equipment (UE) in a wireless communication system, the method comprising: receiving information about a UE group to which the specific UE belongs; receiving first control information comprising first beam information from a representative UE of the UE group; determining second beam information based on the first beam information; and transmitting second control information to the BS, the second control information comprising differential information between the determined second beam information and the first beam information.

In another aspect of the present invention, provided herein is a user equipment (UE) for transmitting channel information in a wireless communication system, the UE comprising: a radio frequency (RF) unit configured to transmit and receive a radio signal; and a processor connected to the RF unit while being operated, wherein the processor is configured to receive information about a UE group to which the UE belongs, to receive first control information comprising first beam information from a representative UE of the UE group, to determine second beam information based on the first beam information, and to transmit second control information to a base station (BS), the second control information comprising differential information between the determined second beam information and the first beam information.

Preferably, the first beam information comprises first precoding matrix index information and the second beam information comprises second precoding matrix index information, and the first precoding matrix index information and the second precoding matrix index information have different numbers of bit information.

Preferably, the differential information comprises remaining bits other than a most significant bit (MSB) corresponding to the first precoding matrix index information from among the second precoding matrix index information.

Preferably, the differential information comprises remaining bits other than a least significant bit (LSB) corresponding to the first precoding matrix index information from among the second precoding matrix index information.

Preferably, the differential information has a same number of bit information as the first precoding matrix index information.

Preferably, a first codebook for the first precoding matrix index information and a second codebook for the second precoding matrix index information have different sizes.

Preferably, the second precoding matrix index information is determined among index information including the first precoding matrix index information from among the second codebook.

Preferably, the first beam information comprises first channel matrix information and the second beam information comprises second channel matrix information, and the differential information indicates a difference between the first channel matrix information and the second channel matrix information.

Preferably, the first channel matrix information comprises only diagonal elements, and the differential information comprises elements other than the diagonal elements of the first channel matrix information from the second channel matrix.

Preferably, the first channel matrix information and the second channel matrix information are channel covariance matrices.

Preferably, the UE group is determined by the BS based on a beam direction, and the information about the UE group is received from the BS.

Advantageous Effects

According to the present invention, channel information may be effectively transmitted and/or received in a wireless communication system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

MODE FOR INVENTION

The following embodiments of the present invention may be applied to a variety of wireless access technologies such as code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be implemented by wireless (or radio) technology such as Institute of Electrical and Electronics Engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. LTE-Advanced (LTE-A) is an evolved version of 3GPP LTE.

For clarity of explanations, the following description focuses on 3GPP LTE(-A) system. However, technical features of the present invention are not limited thereto. Further, a particular terminology is provided for better understanding of the present invention. However, such a particular terminology may be changed without departing from the technical scope of the present invention. For example, the present invention may be applied to a system in accordance with a 3GPP LTE/LTE-A system as well as a system in accordance with another 3GPP standard, IEEE 802.xx standard, or 3GPP2 standard.

In the present specification, a user equipment (UE) may be fixed or mobile. The user equipment (UE) refers to one of various apparatuses communicating with a base station (BS) to transmit and receive data and/or control information. The UE may be referred to as a terminal, a Mobile Station (MS), a Mobile Terminal (MT), a User Terminal (UT), a Subscriber Station (SS), a wireless device, a Personal Digital Assistant (PDA), a wireless modem, a handheld device, etc. In the present specification, the term "UE" may be interchangeably used with the term "terminal".

In the present specification, a base station (BS) generally refers to a fixed station that performs communication with a UE and/or another BS, and exchanges various kinds of data and control information with the UE and another BS. The base station (BS) may be referred to as an advanced base station (ABS), a node-B (NB), an evolved node-B (eNB), a base transceiver system (BTS), an access point (AP), a processing server (PS), a transmission point (TP), etc. In the present invention, the term "BS" may be interchangeably used with the term "eNB".

Distributed Antenna System

Figure 1:
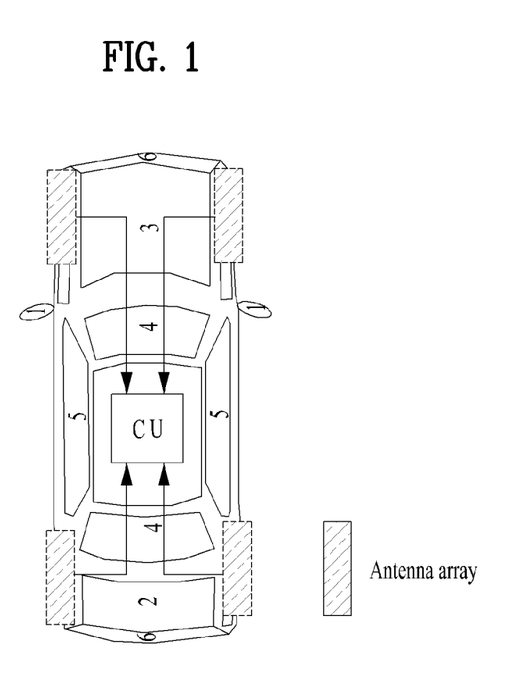
FIG. 1 is a diagram illustrating a distributed antenna system that may be considered in the present invention.

FIG. 1 is a diagram illustrating a distributed antenna system that may be considered in the present invention.

Referring to FIG. 1, antennas that have various shapes and radiation patterns according to an installment position may be distributed at a plurality of portions of a vehicle and a central unit (CU) for integrally controlling transmission and receiving signals through a distributed antenna unit (DU) may be installed. Through a configuration illustrated in FIG. 1, reception diversity gain may be maximized via use of an antenna array, and wireless access between a base station and a vehicle reception end may be prevented from being disconnected through cooperative reception between antennas with different radiation patterns in a high speed movement situation in which a communication environment is abruptly changed.

Figure 2:
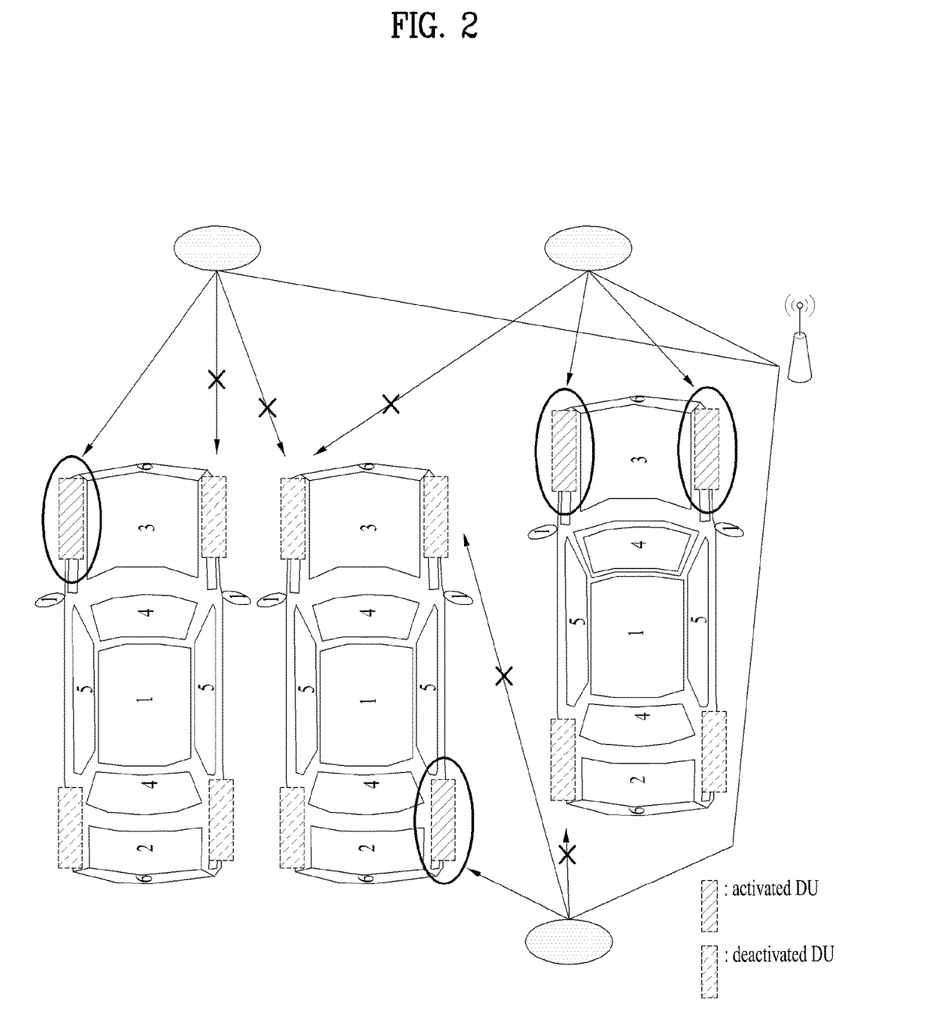
FIG. 2 is a diagram illustrating an example in which a distributed antenna unit is selected in a multi-vehicle situation.

FIG. 2 is a diagram illustrating an example in which a distributed antenna unit is selected in a multi-vehicle situation.

When vehicles are close to each other in a limited area, it is difficult to separate and distinguish beams for users (e.g., vehicles) and distributed antenna arrays thereof due to an issue of beam sharpness in a vehicular distributed antenna array. For example, distributed antenna arrays positioned at very adjacent distances receive signals passing through similar channel environments, and thus the possibility that a plurality of DUs receive the same beam or are blocked by obstacles or cannot receive any beam is very high. Accordingly, in this case, as illustrated in FIG. 2, when a method for selectively activating/deactivating a DU of each vehicle is applied and each vehicle receives beams passing through as much as possible independent paths that experience different clusters from a beam that can be received by an adjacent vehicle through an activated DU of the corresponding vehicle, it may be more advantageous in terms of performance than in the case in which all DUs arranged in each vehicle are activated and used.

Channel State Information (CSI) Measurement and Report

In order to generate a beam appropriate for reception, a transmitting end needs to recognize information about a channel and to accurately measure the appropriate beam and a gain obtained by using the beam based on the recognized channel information. The channel information may be measured by transmitting a separate pilot to the transmitting end by a receiving end, but in the case of a current mobile communication system, the receiving end may measure a channel and then provide the measured information to the transmitting end in the form of CSI. When MIMO is implemented, a channel may be defined by combining sub channels generated between a plurality of transmission and reception antennas, and as the number of antennas used to implement the MIMO increases, a more complex structure may be obtained. According to a method for measuring and reporting channel information, the method may be divided into 1) an implicit CSI reporting method and 2) an explicit CSI reporting method.

The implicit CSI reporting method may be a method for interpreting measured channel information instead of information about a channel measured by a receiving end and selectively reporting only information that is materially required to generate a beam at a transmitting end. Compared with the explicit CSI reporting method, the implicit CSI reporting method is advantageous in that signaling overhead consumed to report CSI is small, and thus the implicit CSI reporting method has been used in a current mobile communication system. For example, the implicit CSI feedback information may include the following information.

When the implicit CSI feedback information has a limited number of precoder candidates, precoder index feedback (e.g., precoding matrix index, and PMI)

Channel Quality Information (CQI)

Rank Information (RI)

The explicit CSI reporting method may be a method for transmitting information that is as much as possible approximate information to a measurement value without interpreting a channel measured by the receiving end. Various methods for reducing signaling overhead used for CSI report via quantization or singular value decomposition (SVD) calculation of a MIMO channel expressed in the form of a matrix may be used. For example, the explicit CSI feedback information may have the following information.

Channel coefficient quantization & quantization index feedback

MIMO matrix or vector quantization & quantization index feedback

Channel covariance matrix feedback

Transmission of Eigen vector of Eigen matrix feedback or Channel matrix and/or Eigen value CSI in LTE System In most cellular systems including a LTE system, a UE may receive a pilot signal or reference signal for channel estimation from a base station, calculate channel state information (CSI), and report the CSI to the base station. The base station may transmit a data signal based on CSI information that is fed back from the UE. The CSI information that is fed back by the UE in the LTE system may include channel quality information (CQI), precoding matrix index (PMI), and rank indicator (RI).

CQI feedback may include radio channel quality information that is provided to a base station for the purpose of providing a guide about a modulation and coding scheme that is applied when the base station transmits data (e.g., link adaptation). When link quality between a base station and a UE is high, the UE may feedback a high CQI value and the base station may apply a relatively high modulation order and a low channel coding rate and transmit data. When link quality between the base station and the UE is low, the UE may feedback a low CQI value and the base station may apply a relatively low modulation order and a high channel coding rate and transmit data.

The PMI feedback may include preferred precoding matrix information that is provided to a base station for the purpose of providing a guide about a MIMO precoding scheme that is applied when the base station is installed with multiple antennas. The UE may estimate a downlink MIMO channel between the base station and the UE from a pilot signal and recommend MIMO precoding to be used by the base station through PMI feedback. An LTE system considers linear MIMO precoding that can be expressed in the form of a matrix for PMI configuration. The base station and the UE may share a codebook configured with a plurality of precoding matrices and each MIMO precoding matrix in the codebook may have a unique index. Accordingly, the UE may feedback an index corresponding to a MIMO precoding matrix that is most preferred in the codebook as PMI so as to minimize the amount of feedback information of the UE.

The RI feedback may include information about the number of preferred transmission layers that are provided to the base station for the purpose of providing a guide about the number of transmission layers preferred by the UE when the base station and the UE are installed with multiple antennas so as to perform multi-layer transmission through spatial multiplexing. The RI has a very close relationship with the PMI. This is because the base station can know precoding to be applied to each layer according to the number of transmission layers. With regard to a PMI/RI feedback configuration, a PMI codebook may be configured based on transmission of a single layer and then PMI may be defined and fed back for each layer, but this method is disadvantageous in that the amount of PMI/RI feedback information is largely increased according to increase in number of transmission layers. Accordingly, a PMI codebook according to the number of transmission layers may be defined in an LTE system. That is, N Nt×R matrices (R is the number of layers, Nt is the number of transmission antenna ports, and N is the size of a codebook) may be defined in a codebook for R layer transmission. Accordingly, the size of the PMI codebook may be defined irrespective of the number of transmission layers in the LTE system. Since PMI/RI is defined according to this structure, the transmission layer number R corresponds to a rank number of the precoding matrix (Nt×R matrix), and thus the transmission layer number R may be referred to as a rank indicator RI.

The CSI information may be obtained from an entire system frequency domain or obtained from a partial frequency domain. In particular, it may be useful to obtain and feedback CSI information about a partial frequency domain (e.g., subband) preferred by each UE in a system using orthogonal frequency division multiple access (OFDMA) technology.

The PMI/RI described in the specification is not limited to indicating an index value of a precoding matrix represented by a Nt×R matrix such as PMI/RI in the LTE system and a rank value of a precoding matrix. The PMI described in the specification may refer to preferred MIMO precoder information among MIMO precoders applicable in a transmission end, and the form of the precoder may not be limited to only a linear precoder that can be represented by a matrix such as in the LTE system. In addition, the RI described in the specification may include any feedback information that refers to a preferred transmission layer number in a broader meaning than in the LTE system.

The PMI information described in the specification is not configured by only one index. In the LTE-A system, a final PMI is divided into W1 as long term and/or wideband (WB) PMI and W2 as short term and/or sub-band (SB) PMI such that PMI with a dual structure is used. For example, the final PMI W may be defined as W=W1*W2 or W=W2*W1. For example, when the number of transmission antenna ports in the LTE-A is 8 or alternativeCodeBookEnabledFor4TX-r12=TRUE is configured via RRC signaling while the number of transmission antenna ports is 4, a final MIMO precoding matrix may be derived by only combining two indexes (WB PMI(W1) and SB PMI(W2)).

CSI feedback using Uplink Channel

In the LTE system, CSI feedback may be performed through an uplink channel. Periodic CSI feedback may be performed through a physical uplink control channel (PUCCH) and aperiodic CSI feedback may be performed through a physical uplink shared channel (PUSCH) as an uplink data channel However, an information payload size in a reporting type may be defined according to a reporting mode and a mode state in CSI feedback through PUCCH, and a payload size of PUCCH format 2/2a/2b (PUCCH format 3 that can be used to apply carrier aggregation is excluded) that is defined in the LTE system may be very restrictive.

Figure 3:
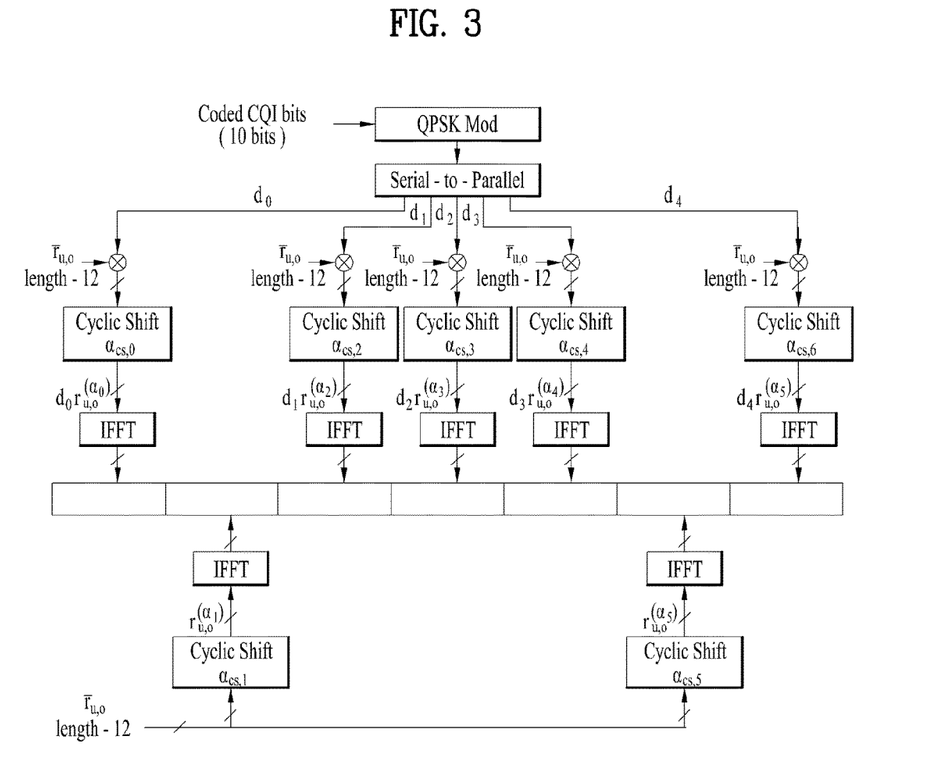
FIG. 3 is a diagram illustrating a structure of PUCCH format 2/2a/2b in an LTE system.

FIG. 3 is a diagram illustrating a structure of PUCCH format 2/2a/2b in an LTE system.

Cyclic shift (CS) of a sequence in each OFDM symbol may be used as PUCCH format. The cyclic shifted sequence may be generated by cyclic shifting a base sequence by as much as a specific CS amount.

FIG. 3 illustrates a channel structure of PUCCH format 2/2a/2b of one slot in a normal CP. PUCCH format 2/2a/2b may be generated through the following steps.

Step 1. 10 CQI information bits may be channel-coded at a ratio of 1/2 to obtain 20 coded bits. For example, a Reed-Muller (RM) code may be used in channel coding.

Step 2. A QPSK modulation symbol may be generated via scrambling and then QPSK constellation mapping (d0 to d4 in slot 0).

Step 3. Each QPSK modulation symbol may be modulated via cyclic shift of a base reference signal (RS) sequence with a length of 12 and then transmitted in each of 10 single carrier frequency division multiple access (SC-FDMAs) symbols in a subframe.

Step 4. 12 cyclic shifts that are uniformly spaced may be configured in such a way that 12 different UEs are orthogonally multiplexed in the same PUCCH resource block. A base RS sequence with a length of 12 may be used for a demodulation reference signal (DM RS) sequence applied to SC-FDMA symbols 1 and 5.

The 20 coded bits in Step 2 may be scrambled by a UE-specific scrambling sequence and may be represented according to Equation 1 below.

$$\tilde{b}(i)=(b(i)+c(i))\bmod 2 \qquad \text{[Equation 1]}$$

In Equation 1, b(i) denotes a control information (or CQI information) bit sequence, c(i) denotes a scrambling sequence, $\tilde{b}(i)$ is a scrambled control information (or CQI information) bit sequence, and mod refers to modulo calculation. The scrambling sequence c(i) may be generated according to Equation 2 and initialized according to Equation 3 at every start of a subframe. In Equation 2, Nc may be 1600, $x_1(0)=1$, and $x_1(n)=0$, n=1, ..., 30.

$$c(n)=(x_1(n+N_c)+x_2(n+N_c))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \qquad \text{[Equation 2]}$$

$$c_{init}=(\lfloor n_s/2 \rfloor+1)\cdot(2N_{ID}^{cell}+1)\cdot 2^{16}+n_{RNTI} \qquad \text{[Equation 3]}$$

In Equation 3, $n_{RNTI}$ may refer to identification information of a corresponding UE and may be a cell-radio network temporary identifier (C-RNTI). Accordingly, when control information (or CQI information) is transmitted through a PUCCH, the control information may be scrambled based on the identification information of the corresponding UE, and another UE cannot recognize the identification information of the corresponding UE, and thus the another UE cannot acquire control information transmitted from the corresponding UE.

Multiuser MIMO for Vehicular Communications

In the case of single user MIMO (SU-MIMO), only data about one user is scheduled in the same time/frequency domain, whereas in the case of multiuser MIMO (MU-MIMO), data for a plurality of users may scheduled together in the same time/frequency domain. The MU-MIMO may multiplex data in the same time/frequency domain to obtain additional gain, but co-channel interference may occur due to users that are scheduled together, thereby causing system performance degradation.

A UE may feedback channel state information (CSI) of the UE, and a base station may schedule a user based on CSI that is fed back from the UE and optimize a system. However, in the case of a current LTE and LTE-A system, when a new UE is additionally scheduled in a SU-MIMO situation or an MU-MIMO situation, influence of interference between UEs, which is generated by scheduling the new UE in a new UE system, may not be considered. That is, only channel information obtained by considering SU-MIMO may be fed back, and the base station can recognize only a channel state of each separate user and cannot acquire information of interference experienced by users in MU-MIMO, and thus it is difficult to reduce influence of interference between the users. Accordingly, when SU-MIMO is converted into MU-MIMO or operates in a MU-MIMO manner, there is a need for a new method for sufficiently obtaining a multiplexing gain to be obtained via multiuser support.

As an example of solutions, a method for enhancing communication performance between multi users via cooperation of vehicles (users) in a dense vehicle environment may be considered.

Figure 4:
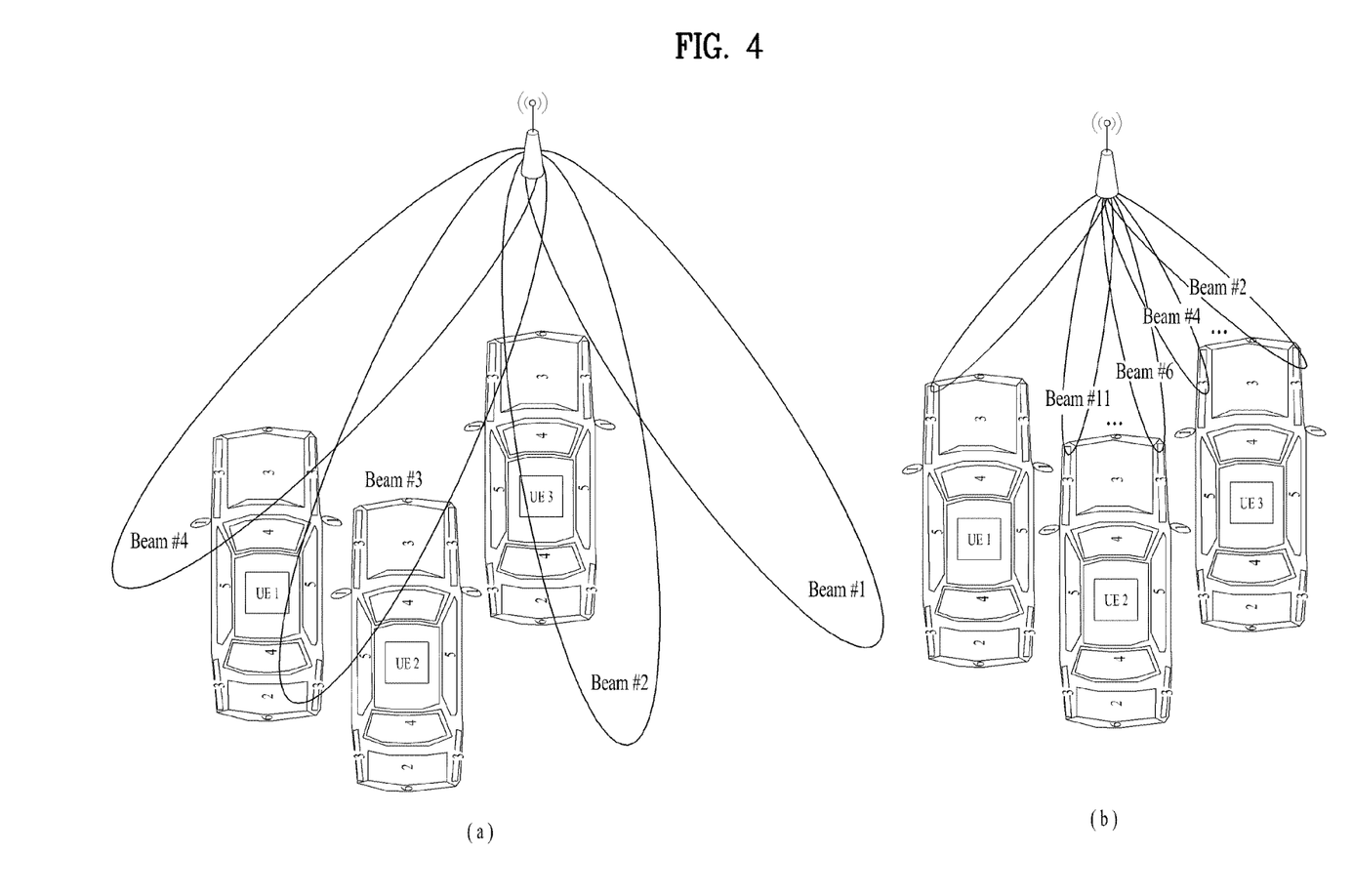
FIG. 4 is a diagram showing a problem of existing codebook-based beamforming.

FIG. 4 is a diagram showing a problem of existing codebook-based beamforming.

When UEs (e.g., vehicles) are densely distributed in a narrow area like a multiple vehicular MIMO, the existing codebook-based beamforming may have limited beam sharpness. For example, as shown in FIG. 4(a), it may be difficult to separate and distinguish beams with respect to densely distributed UEs (e.g., users or vehicles) and distributed antenna array thereof.

To overcome this problem, beam resolution may be enhanced like in an example of FIG. 4(b). As a method of enhancing beam resolution, increase in a codebook size may be considered. However, as described above, in a conventional LTE system, a UE determines a precoder based on channel information measured by the UE and feeds back the channel information in the form of a PMI and, thus, when beam resolution is increased to adjust a dense beam direction, a codebook size may be increased and, accordingly, an amount of information for feedback may be increased.

In a conventional LTE structure, all densely distributed users who experience very similar channels feedback channel information thereof to cause signaling inefficiency due to redundant channel information feedback. To overcome these problems, the present invention proposes a method in which UEs share some channel information (e.g., some of PMI feedback bit) based on cooperation between the UEs and each UE feeds back only a differential value based on the shared channel information with respect to channel information thereof.

Differential Channel Information Feedback Method

The present invention proposes a differential channel information feedback method based on cooperation between vehicles. For example, the methods according to the present invention may be used in multiple vehicular MIMO based on cooperation between UEs (e.g., vehicles). In more detail, the methods according to the present invention may be used to estimate and report channel information between each UE (e.g., a vehicle) and an eNB during multi-vehicle communication. Although the present invention is described in terms of multi-vehicle communication, this may be merely an example and, thus, the present invention may also be applied in the same way in a general multiuser multiple antenna system situation.

The differential channel information feedback method according to the present invention may include three operations.

Operation 1: Grouping of UEs Based on Beam Direction

In operation 1, an eNB may group UEs based on a beam direction. For example, the eNB may group UEs with similar beam directions to one group. In more detail, the eNB may group UEs that belong to similar beam directions according to a beam direction to each UE from the eNB and, thereby, may feedback beam information preferred by adjacent UEs or some of the grouped UEs to the eNB.

A UE that feeds back preferred beam information thereof (e.g., a beam direction) to the eNB may be autonomously determined via cooperation between UEs, may be specified by the eNB, or may be a specific-UE type of UE. A UE that is determined to feedback preferred beam information among UEs grouped by the eNB may be referred to as a representative UE or a header UE (or a header UE) and the other UEs except for the representative UE in a single group may be referred to as a member UE.

In operation 1 according to the present invention, the eNB may group UEs belonging to similar beam directions and, then, may transmit/share information about a UE group to each UE in the UE group. For example, the information about the UE group, which is transmitted/shared to each UE in the UE group by the eNB, may include information indicating a representative UE and/or information indicating a member UE. As another example, the information about the UE group, which is transmitted/shared by the eNB may indicate a representative UE and/or a member UE through one information item.

In operation 1 according to the present invention, each UE in a UE group may receive information about the UE group from the eNB and, then, may identify whether the corresponding UE is a representative UE in the group. Upon identifying that a specific UE is a representative UE based on the information about the UE group, the specific UE (or a representative UE) may transmit preferred beam information thereof to the eNB. On other hand, upon identifying that the specific UE is a member UE based on the information about the UE group, the corresponding UE may not transmit/report preferred beam information thereof to the eNB.

The preferred beam information transmitted by the representative UE may be determined based on a pre-defined codebook. In this case, the preferred beam information may include index information corresponding to a preferred beam direction of a codebook. For example, the preferred beam information may include index information indicating a precoding matrix corresponding to the preferred beam direction of the codebook. As a more detailed example, when a pre-defined has size N, the index information may be represented in $\log_2 N$ bits. Alternatively, preferred beam information transmitted from a representative UE may include a channel matrix (e.g., a channel covariance matrix).

Figure 5:
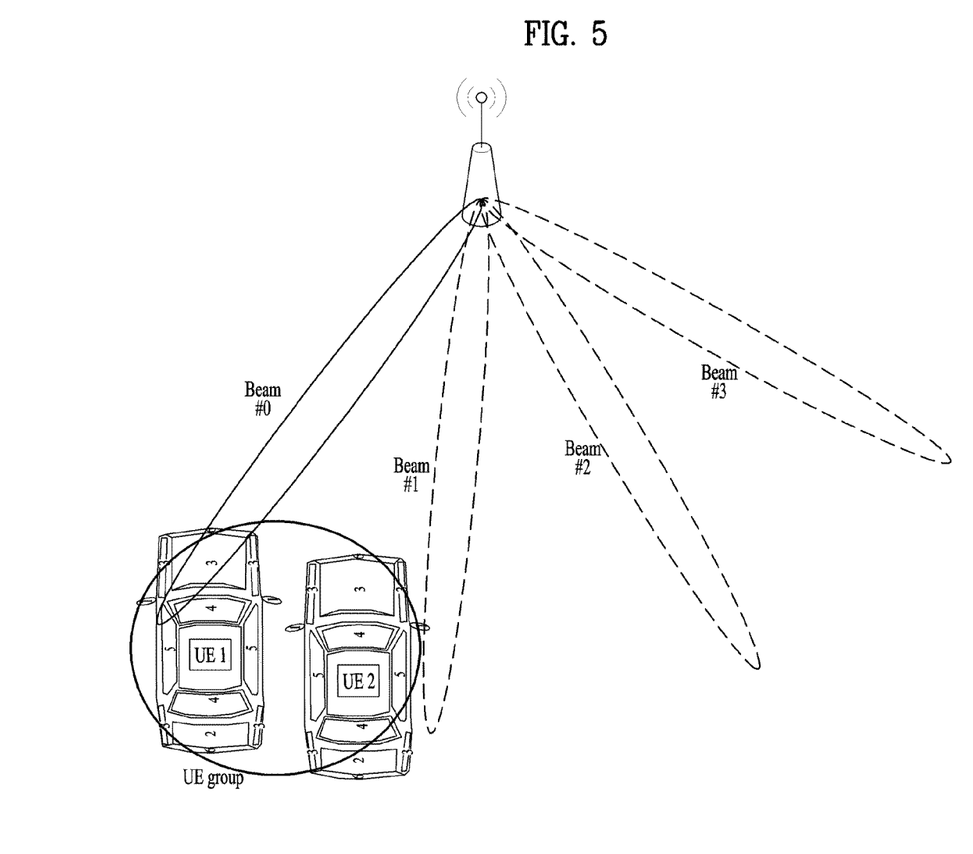
FIG. 5 is a diagram showing an example of UE grouping according to the present invention.

FIG. 5 is a diagram showing an example of UE grouping according to the present invention. In the example of FIG. 5, an eNB may be assumed to group UEs (e.g., UE1 and UE2) with similar beam directions and to determine a representative UE as UE1. FIG. 5 is merely an example, a UE group may further include other UEs, and a representative UE (e.g., UE1) may be determined via cooperation between UEs in a UE group or may be determined as a specific type of UE.

Referring to FIG. 5, a representative UE (e.g., UE1) may receive information about a UE group from an eNB and, then, may identify that the corresponding UE is a representative UE. The representative UE (e.g., UE1) may determine preferred beam direction thereof based on a pre-defined codebook and, then, may report beam information (e.g., precoding matrix information) corresponding to the determined preferred beam direction to the eNB. For example, assuming a codebook with size 4, the representative UE (e.g., UE1) may determine beam information thereof based on a codebook with size 4 and may transmit 2-bit feedback information corresponding to the determined beam information to the eNB. In this case, the 2-bit feedback information may correspond to a beam index indicating, for example, a preferred beam direction. In the example of FIG. 5, the representative UE (e.g., UE1) may determine preferred beam direction thereof as beam #0 and, then, may transmit/report bit 00 corresponding to beam index #0 to the eNB. In this case, a member UE (e.g., UE2) may not transmit/report preferred beam information to the eNB.

Operation 2: A Member UE Acquires Preferred Beam Information of a Representative UE In operation 2 according to the present invention, a member UE may acquire preferred beam information of a representative UE. In more detail, the member UE (or other UEs that do not feedback beam information to the eNB) may acquire preferred beam information that has been transmitted/reported to the eNB or is to be transmitted/reported by some UEs (e.g., a representative UE) to the eNB. The member UE may be a UE that does not transmit/report preferred beam information thereof to the eNB among adjacent UEs or grouped UEs.

A method of acquiring preferred beam information that has been reported (or to be reported) to the eNB by some selected UEs (e.g., a representative UE) by the other UEs (e.g., a member UE) may be performed using two following methods.

Method 2-A: An eNB Notifies the Other UEs about Reported Beam Information

In Method 2-A according to the present invention, the eNB may notify each of the other UEs (e.g., a member UE) about beam information reported by some UE(s) (e.g., a representative UE) in a UE group. The eNB may use the following method to notify each UE (e.g., a member UE) about beam information (e.g., preferred beam information of a representative UE).

The eNB may broadcast or multicast beam information received/reported from some UEs (e.g., a representative UE) in a UE group to UEs (or a member UE of a UE group) belonging to similar beam directions. For example, the eNB may broadcast beam information received from a representative UE to UEs belonging to a UE group or grouped UEs in operation 1 according to the present invention. As another example, the eNB may multicast beam information received from a representative UE to adjacent UEs to a UE (e.g., a representative UE) that feeds back preferred beam information.

The eNB may notify a specific UE(s) among UEs belonging to similar beam directions as a target about beam information received/reported by the eNB via signaling and the other UE(s) may overhear corresponding signaling to acquire preferred beam information of a representative UE. For example, the eNB may transmit a signal including preferred beam information of a representative UE to a specific UE(s) among UEs belonging to a UE group or grouped UEs in operation 1 according to the present invention and grouped UEs or the other UEs belonging to a UE group may overhear a signal transmitted from the eNB to acquire preferred beam information of a representative UE.

In the present specification, overhearing may refer to reception and/or acquisition of UE-specific information (e.g., downlink control information (DCI) and uplink control information (UCI)) of another UE by a specific UE. In more detail, overhearing may include acquiring scrambling information for control information of another UE by a specific UE and decoding and/or acquiring the control information of the other UE using the acquired scrambling information. For example, a specific UE may acquire identification information (e.g., C-RNTI) of another UE via overhearing and, then, may decode and/or acquire the control information (e.g., preferred beam information) of the other UE using the acquired identification information (e.g., C-RNTI). In the present specification, scrambling information may not be limited only to C-RNTI information and other information may be used.

Method 2-B: Some UEs Belonging to a UE Group Notify each UE about Preferred Beam Information In Method 2-B according to the present invention, some UEs (e.g., a representative UE) belonging to a UE group may directly notify each eNB (e.g., a member UE) about beam information reported (or to be reported) to the eNB.

Some UEs belonging to a UE group may use the following method to notify each UE in a group about beam information reported (or to be reported) to the eNB by the UEs.

Some UE(s) (e.g., a representative UE) that transmit/report (preferred) beam information may transmit corresponding beam information via UE-to-UE communication (e.g., UE-to-UE direct communication or device-to-device (D2D) communication) to the other UE(s) (e.g., a member UE).

When a specific UE (e.g., a member UE) feeds back preferred beam information to an eNB, adjacent UEs or other UEs belonging to a group may overhear the corresponding information.

Operation 3: A Differential Value of Beam Information is Fed Back to an eNB

In operation 3 according to the present invention, each UE may determine preferred beam direction thereof and may feedback the preferred beam direction to an eNB. Each UE may determine a beam direction based on a codebook representing denser beam resolution, based on beam information that is transmitted/fed back to the eNB by an adjacent UE (or representative UE) belonging to similar beam directions that have been already acquired by the UE, to determine preferred beam thereof. Each UE may transmit/feedback only a differential value of the beam determined in operation 2 based on the beam information that is transmitted/fed back by an adjacent UE (or a representative UE) that has been already acquired in operation 2 according to the present invention.

The differential value that is transmitted/fed back to the eNB in operation 3 according to the present invention may refer to a differential value between beam information corresponding dense beam resolution and the beam information acquired in operation 2. For example, a codebook representing dense beam resolution may include a precoding matrix indicating a beam with enhanced beam resolution based on an existing codebook. As a detailed example, a plurality of beam information items indicating dense beam resolution may be added to index information of an existing codebook and the index information of the codebook indicating dense beam resolution may be represented to extend index information of the existing codebook. In this case, the index information of the existing codebook may correspond to a most significant bit (MSB) of the index information of the codebook for dense beam resolution.

For example, assuming that preferred beam information based on the existing codebook includes first beam index information in operation 1 and beam information determined based on the codebook for dense beam resolution includes second beam index information in operation 3, the differential value according to the present invention may correspond to a bit value obtained by excluding a bit indicating the first beam index information from a MSB of the second beam index information. In this case, when the first beam index information includes M bits and the second beam index information includes N (>M) bits, the differential value may include (N−M) LSB bits of the second beam index information.

As another example, the differential value transmitted in operation 3 may correspond to a specific MSB of codebook information for dense beam resolution. In this case, the beam index information determined in operation 1 according to the existing codebook may correspond to an LSB of the beam index information determined in operation 3 according to a codebook for dense beam resolution. Accordingly, when the first beam index information includes M bits and the second beam index information includes N(>M) bits, the differential value may include (N−M) MSB bits of the second beam index information.

To indicate the differential value according to the present invention as a specific MSB or LSB of the index information of the codebook for dense beam resolution, the beam information of each UE in operation 3 according to the present invention may be determined based on the beam information (e.g., preferred beam information of a representative UE) acquired in operation 2. In more detail, the beam information of each UE in operation 3 may be determined among beam information items including the beam information acquired in operation 2. For example, the beam information of each UE in operation 3 may be limited to be determined among only beam information items indicating the beam information acquired in operation 2. As a detailed example, the beam information of each UE in operation 3 may be determined among only beam information items including a bit corresponding to the beam information acquired in operation 2 from the codebook for dense beam resolution in an MSB or an LSB.

Figure 6:
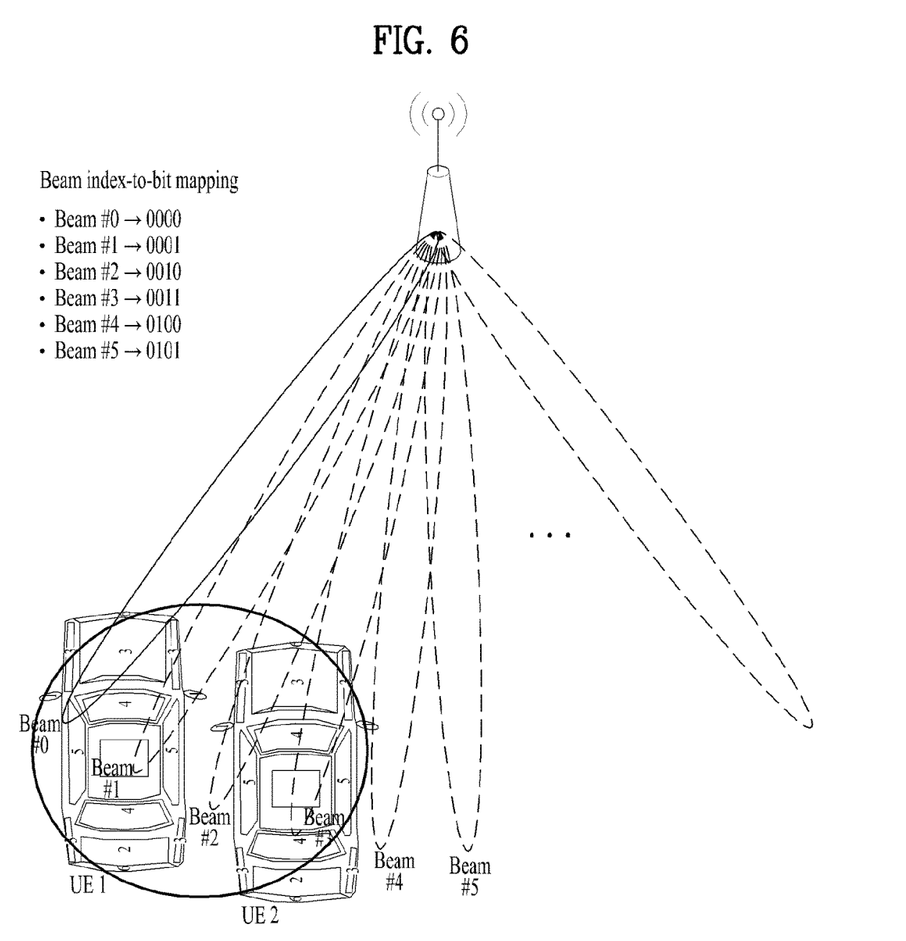
FIG. 6 is a diagram showing an example of a case in which a differential value of beam information is fed back according to the present invention.

FIG. 6 is a diagram showing an example of a case in which a differential value of beam information is fed back according to the present invention. The example of FIG. 6 may be based on the example of FIG. 5 and it may be assumed that UE1 and UE2 are grouped and UE1 is determined as a representative UE. In addition, it may be assumed that an existing codebook has size 4 and index information represented in 2 bits and a codebook for dense beam resolution has size 16 and index information represented in 4 bits. FIG. 6 is merely an example and, even if a size of an existing codebook and a size of a codebook for dense beam resolution are different, the principle according to the present invention may be applied in the same/similar way.

Referring to FIG. 6, a member UE (e.g., UE2) may identify that a representative UE is UE1 and the corresponding UE is a member UE through operation 1 according to the present invention. In addition, the member UE (e.g., UE2) may recognize that information that is fed back to an eNB by UE1 belonging to a similar beam group to the member UE is 2-bit PMI feedback and '00' through operation 2 according to the present invention. Accordingly, although the member UE (e.g., UE2) searches for preferred beam thereof based on the codebook representing denser beam resolution and the number of bits to be fed back to the eNB is increased as shown in FIG. 6, only a feedback bit (i.e., only a differential value compared with feedback of UE1) that is changed compared with a PMI feedback bit of a representative UE (e.g., UE1) that is already known by the member UE may be transmitted/fed back to the eNB.

For example, when a member UE (e.g., UE2) selects beam #3 as a preferred beam based on a codebook with size 16, the member UE (e.g., UE2) needs to perform 4-bit feedback of '0011' to report corresponding beam index information to the eNB, in principle. On the other hand, according to the present invention, the member UE (e.g., UE2) recognizes that a representative UE (e.g., UE1) belonging to the same group as the member UE selects beam #0 as a preferred beam and reports '00' as 2-bit feedback and, thus, the member UE (e.g., UE2) may omit MSB 2 bit '00' that overlaps with preferred beam information of the representative UE (e.g., UE1) from 4-bit feedback '0011' to be fed back by the member UE and may transmit/report only 2 bits '11' as a differential value compared with a beam direction of the representative UE (e.g., UE1) to the eNB.

Although FIG. 6 shows an example in which an MSB corresponding to beam information of the representative UE (e.g., UE1) is omitted and the remaining LSB is transmitted as a differential value, an LSB corresponding to beam information of the representative UE (e.g., UE1) may be omitted and the remaining MSB may be transmitted as a differential value, as described above.

The member UE (e.g., UE2) may determine preferred beam information thereof among only beam information items including a bit indicating beam information of the representative UE (e.g., UE1) in an MSB. For example, referring to FIG. 6, the member UE (e.g., UE2) knows that a bit indicating beam information of the representative UE (e.g., UE1) is '00' and, thus, preferred beam information thereof may be limited to be determined among only beams #0 to #3 including '00' in an MSB. As another example, differently from the example of FIG. 6, a beam index may be represented in beam #0 ('0000'), beam #1 ('1000'), beam #2 ('0100'), beam #3 ('1100'), . . . and preferred beam information thereof may be limited to be determined among only beams #0 to #3 including bit '00' indicating beam information of the representative UE (e.g., UE1) in an LSB.

When the differential value feedback-based method proposed by the present invention is used, only some UEs (e.g., a representative UE) may transmit/feedback whole beam information between UEs with high possibility of similar beam directions and the other UEs (e.g., a member UE) may transmit/report only a differential value of beam information that is transmitted/fed back by some UEs and, accordingly, overhead may be remarkably reduced in terms of a system.

When the method proposed by the present invention is used, preferred beam information may be set to be reported based on codebooks with different sizes for respective users. For example, a representative UE may be set to report preferred beam information based on an existing codebook size and a member UE may be set to report preferred beam information based on a codebook size for dense beam resolution.

In addition, a differential value may be fed back to acquire an effect of inter-beam interpolation compared with a representative UE (or a header UE) that already share beam information in a group and, accordingly, a gain of virtually enhancing beam resolution may be obtained with even low feedback payload.

Accordingly, when the present invention is applied to set a representative UE as a UE that supports an existing LTE system and to set a member UE as a UE that supports a post LTE system (e.g., 5$^{th}$ generation (5G) communication system), beam resolution may be advantageously enhanced while codebooks with different sizes are applied to respective UEs and system overhead is not largely degraded.

Figure 7:
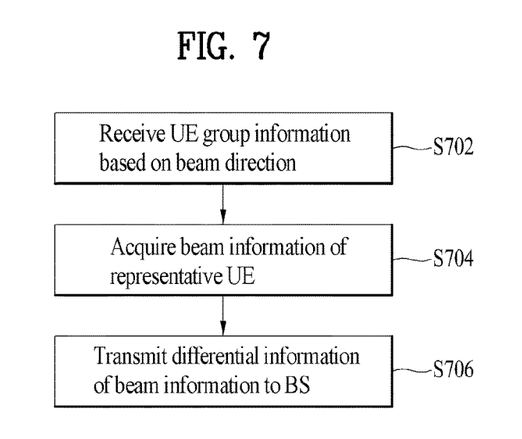
FIG. 7 is a flowchart showing an example of a method according to the present invention.

FIG. 7 is a flowchart showing an example of a method according to the present invention.

In operation S702, an operation described with regard to operation 1 according to the present invention may be performed. An eNB may group UEs based on a beam direction and may transmit/share information about a UE group to each UE in a UE group. Each UE in a UE group may receive information about the UE group from an eNB. The UE group may include a representative UE or a header UE and may include the remaining member UEs obtained by excluding the representative UE. Information about a UE group may include information indicating a representative UE in the UE group and/or information indicating a member UE.

A representative UE may primarily feedback preferred beam information thereof in a UE group to an eNB and may be determined via cooperation between UEs and may be a UE determined by the eNB or a specific type of UE. For example, the representative UE may be determined as a UE that supports only a codebook supported in an existing LTE system. As another example, when codebook with different sizes for a precoding matrix is supported in a wireless communication system, the representative UE may be determined as a UE that supports only a first codebook with a small size (or indicating a broad beam direction) and the member UE may be determined as a UE that supports a second codebook with a large size (or indicating a dense beam direction) as well as a first codebook.

In operation S702, each UE of a UE group may receive information about the UE group and, then, may identify whether the corresponding UE is a representative member or a member UE. When the UE is identified as a representative UE, the corresponding UE may transmit control information including preferred beam information to the eNB and, when the corresponding UE is identified as a member UE, the corresponding UE may not transmit preferred beam information in operation S702.

The preferred beam information transmitted in operation S702 may be referred to as first beam information. The first beam information may be determined based on a first codebook with size N indicating a broad beam direction and may include first precoding matrix index information about the first codebook. In this case, the first precoding matrix index information may include $\log_2 N$ bit information items.

In operation S704, an operation described with regard to operation 2 according to the present invention may be performed. The member UE may acquire preferred beam information (or first beam information) that is transmitted/reported or to be transmitted/reported by the representative UE in operation S702. As described with regard to operation 2 according to the present invention, the member UE may acquire preferred beam information (or first beam information) of the representative UE according to Method 2-A or 2-B according to the present invention.

In operation S706, an operation described with regard to operation 3 according to the present invention may be performed. The member UE may determine preferred beam information thereof based on the preferred beam information (or first beam information) of the representative UE acquired in operation S702. The preferred beam information of the member UE determined in operation S706 may be referred to as second beam information. The second beam information may be determined based on a second codebook with size M(>N) indicating dense beam resolution and may include second precoding matrix index information of a second codebook. In this case, the second precoding matrix index information may include $\log_2 M$ bit information items. The first codebook and the second codebook represent different beam resolutions and, thus, may have different sizes. For example, a second codebook size M may be set to be greater than a first codebook size N to represent denser beam resolution of the second codebook than the first codebook. In this case, the first precoding matrix index information may have different number of bit information items from the second precoding matrix index information.

In operation S706, the member UE may transmit control information including differential information between preferred beam information (first beam information) of the representative UE and preferred beam information (second beam information) of the member UE to the eNB. The differential information may be represented as a difference between the first precoding matrix index information of the representative UE and the second precoding matrix index information of the member UE.

For example, the differential information may include the remaining bits obtained by excluding a most significant bit (MSB) corresponding to the first precoding matrix index information from the second precoding matrix index information. As another example, the differential information may include the remaining bits obtained by excluding a least significant bit (LSB) corresponding to the first precoding matrix index information from the second precoding matrix index. To this end, the member UE may determine the second precoding matrix index information among index information items including the first precoding matrix index information from the second codebook.

The eNB may combine the differential information received in operation S706 and the first beam information (or the first precoding matrix index information) received in operation S702 to acquire preferred beam information of the member UE. The eNB may transmit a beam to the member UE based on the preferred beam information acquired in operation S706. The eNB may transmit a beam to the representative UE based on the preferred beam information of the representative UE acquired in operation S702.

Although the methods according to the present invention have been described based on implicit CSI feedback (e.g., PMI-based channel information report) thus far, the methods according to the present invention may not be limited only to the implicit CSI feedback and may be applied in the same/similar method in an explicit CSI feedback-based system. For example, the representative UE may report channel covariance matrix 'H' measured by the representative UE instead of representing and reporting preferred beam direction information of the representative UE as a beam index in operation 1. In this case, the remaining UEs (e.g., a member UE) in a group that acquire CSI feedback information of the representative UE may report a differential value compared with 'H', such as 'H1-H', to the eNB to reduce feedback overhead instead of reporting whole explicit CSI 'H1' measured by the remaining UEs to the eNB.

As a detailed example, the representative UE in operation 1 may transmit/report a channel matrix and the member UE in operation 3 may transmit/report a difference value between a channel matrix measured by the member UE and a channel matrix transmitted/reported by the representative UE. Information format of explicit CSI feedback may not be limited only to the channel covariance matrix and may have the form of Eigen vector and/or Eigen value of channel coefficient quantization & quantization index feedback, MIMO matrix or vector quantization & quantization index feedback, Eigen matrix feedback, or a channel matrix. As another example, the representative UE in operation 1 may transmit/report diagonal elements of a channel matrix and the member UE in operation 3 may transmit/report the remaining elements obtained by excluding diagonal elements of the channel matrix.

In the specification, although the methods according to the present invention have been described in terms of multi-vehicle communication, the present invention is not limited thereto and may be applied in the same way to a general multiuser multi antenna system situation. Thus, the present invention may be applicable to a UE other than a vehicle in the same or similar manner FIG. 8 is a diagram illustrating a BS 110 and a UE 120 to which the present invention is applicable.

Figure 8:
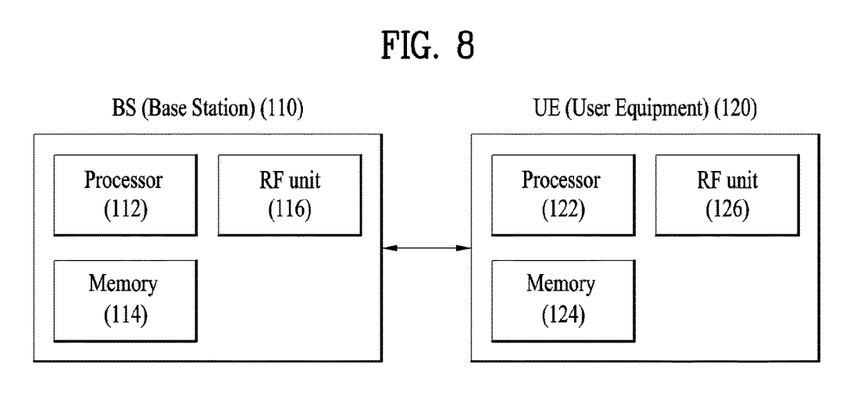
FIG. 8 is a diagram illustrating a BS and a UE to which the present invention is applicable.

Referring to FIG. 8, a wireless communication system includes the BS 110 and the UE 120. When the wireless communication system includes a relay, the BS 110 or the UE 120 can be replaced with the relay.

The BS 110 includes a processor 112, a memory 114, and a radio frequency (RF) unit 116. The processor 112 may be configured to embody the procedures and/or methods proposed by the present invention. The memory 114 is connected to the processor 112 and stores various pieces of information associated with an operation of the processor 112. The RF unit 116 is connected to the processor 112 and transmits/receives a radio signal. The UE 120 includes a process 122, a memory 124, and an RF unit 126. The processor 122 may be configured to embody the procedures and/or methods proposed by the present invention. The memory 124 is connected to the processor 122 and stores various pieces of information associated with an operation of the processor 122. The RF unit 126 is connected to the processor 122 and transmits/receives a radio signal.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "terminal" may also be replaced with a user equipment (UE), a mobile station (MS) or a mobile subscriber station (MSS) as necessary.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the scope of the invention. Thus, it is intended that the present invention cover the modifications and variations of this invention provided they come within the scope of the appended claims and their equivalents.

INDUSTRIAL APPLICABILITY

The present invention is applicable to a wireless communication apparatus such as a user equipment (UE), a base station (BS), etc.

The invention claimed is:

1. A method of transmitting channel information to a base station (BS) by a specific user equipment (UE) in a wireless communication system, the method comprising:
    receiving information about a UE group to which the specific UE belongs;
    receiving first control information comprising first beam information from a representative UE of the UE group;
    determining second beam information based on the first beam information; and
    transmitting second control information to the BS, the second control information comprising differential information between the determined second beam information and the first beam information,
    wherein the first beam information comprises first precoding matrix index information and the second beam information comprises second precoding matrix index information,
    wherein the first precoding matrix index information and the second precoding matrix index information have different numbers of bit information, and
    wherein the differential information comprises remaining bits other than a most significant bit (MSB) corresponding to the first precoding matrix index information from among the second precoding matrix index information.

2. The method according to claim 1, wherein the differential information has a same number of bit information as the first precoding matrix index information.

3. The method according to claim 1, wherein a first codebook for the first precoding matrix index information and a second codebook for the second precoding matrix index information have different sizes.

4. The method according to claim 1 wherein the second precoding matrix index information is determined among index information including the first precoding matrix index information from among the second codebook.

5. The method according to claim 1, wherein the UE group is determined by the BS based on a beam direction, and the information about the UE group is received from the BS.

6. A user equipment (UE) for transmitting channel information in a wireless communication system, the UE comprising:
    a radio frequency (RF) unit configured to transmit and receive a radio signal; and
    a processor operatively connected to the RF unit,
    wherein the processor is configured to receive information about a UE group to which the UE belongs, to receive first control information comprising first beam information from a representative UE of the UE group, to determine second beam information based on the first beam information, and to transmit second control information to a base station (BS), the second control information comprising differential information between the determined second beam information and the first beam information, wherein the first beam information comprises first precoding matrix index information and the second beam information comprises second precoding matrix index information, wherein the first precoding matrix index information and the second precoding matrix index information have different numbers of bit information, and wherein the differential information comprises remaining bits other than a most significant bit (MSB) corresponding to the first precoding matrix index information from among the second precoding matrix index information.

7. The UE according to claim 6, wherein the differential information has a same number of bit information as the first precoding matrix index information.

8. The UE according to claim 6, wherein a first codebook for the first precoding matrix index information and a second codebook for the second precoding matrix index information have different sizes.

9. The UE according to claim 6, wherein the second precoding matrix index information is determined among index information including the first precoding matrix index information from among the second codebook.

10. The UE according to claim 6, wherein the UE group is determined by the BS based on a beam direction, and the information about the UE group is received from the BS.

* * * * *